United States Patent
Smith et al.

(10) Patent No.: US 9,132,955 B2
(45) Date of Patent: Sep. 15, 2015

(54) COMPRESSIBLE VALVE FOR A PRESSURIZED CONTAINER

(71) Applicant: The Procter & Gamble Company, Cincinnati, OH (US)

(72) Inventors: Scott Edward Smith, Cincinnati, OH (US); Andrew William Franckhauser, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/061,243

(22) Filed: Oct. 23, 2013

(65) Prior Publication Data
US 2015/0108387 A1    Apr. 23, 2015

(51) Int. Cl.
B65D 83/00    (2006.01)
B65D 83/48    (2006.01)
F16K 1/34     (2006.01)

(52) U.S. Cl.
CPC .. B65D 83/48 (2013.01); F16K 1/34 (2013.01)

(58) Field of Classification Search
CPC ........ B65D 83/20; B65D 83/32; B65D 83/44; B65D 83/46; B65D 83/48; B65D 83/62; B65D 83/38
USPC .............. 222/105, 342, 386.5, 402.1, 402.21, 222/402.22, 402.23, 464.1, 402.24, 153.09
See application file for complete search history.

(56) References Cited

U.S. PATENT DOCUMENTS

| | | | |
|---|---|---|---|
| 2,779,516 A * | 1/1957 | Soffer | 222/402.22 |
| 2,788,924 A * | 4/1957 | Soffer | 222/402.22 |
| 2,831,618 A * | 4/1958 | Soffer et al. | 222/402.22 |
| 2,852,168 A * | 9/1958 | Suellentrop | 222/402.22 |
| 2,912,144 A * | 11/1959 | Luddecke | 222/402.21 |
| 2,994,461 A | 8/1961 | Michel | |
| 3,169,525 A * | 2/1965 | Bowen | 128/200.23 |
| 3,482,737 A * | 12/1969 | Steckhahn et al. | 222/94 |
| 3,735,955 A * | 5/1973 | Kerr et al. | 251/303 |
| 3,926,349 A * | 12/1975 | Schultz | 222/402.22 |
| 4,008,834 A * | 2/1977 | Towns | 222/402.23 |
| 4,545,506 A * | 10/1985 | Kadono | 222/95 |
| 4,669,639 A * | 6/1987 | Klarenbach et al. | 222/396 |
| 5,456,386 A * | 10/1995 | Jesswein | 222/136 |
| 5,957,333 A * | 9/1999 | Losenno et al. | 222/95 |
| 6,390,326 B1 * | 5/2002 | Hung | 220/616 |

(Continued)

FOREIGN PATENT DOCUMENTS

GB    0774904    5/1957

OTHER PUBLICATIONS

PCT International Search Report and Written Opinion for PCT/US2014/061291 dated Jan. 30, 2015.

*Primary Examiner* — Patrick M Buechner
(74) *Attorney, Agent, or Firm* — Jay A. Krebs

(57) ABSTRACT

A compressible valve is used with a pressurized container for dispensing an aerosol product. The compressible valve includes a valve cup connected to a dispensing structure disposed inside an open top end of a bottle. A grommet is disposed in the valve cup and has an integral sealing portion and spring portion. A grommet longitudinal passageway passes through the spring portion and the sealing portion and is coaxial with a valve cup longitudinal passageway. An elongate valve stem is disposed in the grommet passageway. The grommet sealing portion provides a seal between the valve stem and the valve cup and between the dispensing structure and the valve cup.

19 Claims, 6 Drawing Sheets

(56) References Cited

U.S. PATENT DOCUMENTS

| | | |
|---|---|---|
| 7,303,087 B2 * | 12/2007 | Flashinski et al. ............... 215/42 |
| 7,832,597 B2 * | 11/2010 | Scheindel ................ 222/402.22 |
| 2006/0243940 A1 | 11/2006 | De Schrijver |
| 2007/0245538 A1 * | 10/2007 | Salameh ......................... 29/453 |
| 2011/0017701 A1 * | 1/2011 | Soliman ........................ 215/381 |
| 2011/0108574 A1 * | 5/2011 | Nimmo et al. ................... 222/95 |
| 2012/0138639 A1 * | 6/2012 | Scheindel ................ 222/402.22 |
| 2014/0048567 A1 | 2/2014 | Dhaenens et al. |
| 2015/0014990 A1 | 1/2015 | Bodet et al. |

* cited by examiner

COMPRESSIBLE VALVE FOR A PRESSURIZED CONTAINER

FIELD OF THE INVENTION

The present invention relates to a compressible valve for a pressurized container. Particularly, a compressible valve for use with a pressurized container for dispensing an aerosol product.

BACKGROUND OF THE INVENTION

The present invention relates to dispensers for aerosols or other pressurized products, and more particularly to a pressure resistant plastic bottle for dispensing an aerosol or other comparably pressurized product.

The term "aerosol" will be understood herein to mean any non-refillable receptacle containing a gas compressed, liquefied or dissolved under pressure, the sole purpose of which is to expel a nonpoisonous (other than a Division 6.1 Packing Group III material) liquid, paste, or powder and fitted with a self-closing release device allowing the contents to be ejected by the gas. Aerosol products include but are not limited to foamed or gel preparations or to liquid products delivered in a non-aerosol stream.

Pressurized containers for dispensing aerosols are well known in the art, and are typically constructed of metal in order to withstand the inherent internal pressure of aerosols. However, it is desirable to provide a plastic container capable of withstanding the internal pressures generated by an aerosol because plastic has many advantages over metal. Some of these advantages include the ease and economy of manufacture, aesthetic appeal to an end user, it doesn't rust, and the ability to recycle.

Such pressurized containers have a dispensing nozzle or dispensing orifice to allow the product to be dispensed from the package. The dispensing nozzle or dispensing orifice may be disposed near the top of the package, although other configurations and locations are also known in the art. Dispensing nozzles are typically spring loaded actuators manufactured from metal in order to provide reliable components such as springs, valve cups and valve stems. Plastic pressurized containers including such valves are typically non recyclable. Thus, the ability to recycle plastic pressurized containers is often limited due to dispensing nozzle.

Thus the purpose of the present invention is to construct a recyclable plastic valve that can be readily opened through hand pressure of the user and provides the necessary sealing effectiveness required for pressurized containers.

It is a further and related purpose of this invention to meet the above objectives in a design composed of minimal parts that are easy to manufacture and assemble so as to make this improved valve economically viable or attractive in a wide range of pressurized dispensing containers.

SUMMARY OF THE INVENTION

The invention features, in general, a compressible valve for use with a pressurized container for dispensing an aerosol product. The pressurized container has a longitudinal axis defining a longitudinal direction and comprises a bottle having a closed bottom end and an open top end forming a neck longitudinally opposed to the closed bottom portion. A dispensing structure is disposed inside the open top end of the bottle. The dispensing structure has an open end coaxial with the bottle open top end. The dispensing structure can comprise dip tube valve comprising a valve housing and a tube in standard aerosol package. Alternatively, the dispensing structure can comprise an aerosol barrier package disposed in a bottle including a bag on valve design, a bag in bottle design or a piston in bottle design. The compressible valve is disposed inside the open top end of the bottle and interfaces with the dispensing structure. The compressible valve comprises a valve cup, a grommet and a valve stem.

The valve cup has an open top portion, a bottom portion with an opening therein and a longitudinal passageway between the open top portion and the bottom portion opening. The valve cup longitudinal passageway is coaxial with the bottle open top end and the dispensing structure open end.

A grommet is disposed in the valve cup. The grommet has a spring portion and a sealing portion wherein the spring portion is integral with the sealing portion. The grommet spring portion is longitudinally opposed to the grommet sealing portion towards the open top portion of the valve cup. The spring portion is deformable in the longitudinal direction and includes a spring portion opening having an internal diameter. The sealing portion includes a sealing portion opening having an internal diameter. The grommet sealing portion is joined to the valve cup bottom portion opening such that the sealing portion opening is coaxial with the bottom portion opening. A grommet longitudinal passageway connects the spring portion opening and the sealing portion opening and has an internal diameter that is coaxial with the valve cup longitudinal passageway.

The grommet sealing portion extends radially along the external surface of the bottom portion of the valve cup providing a seal between the dispensing structure and the valve cup. The sealing portion of the grommet can comprise a clevis composed of two vertically opposed discs forming a circumferential C-shaped opening. The two discs extend radially outward from the sealing portion opening sandwiching the valve cup bottom portion opening therebetween. In addition, the grommet sealing portion opening includes a wiper blade located at the sealing portion opening and a sealing lip located above the wiper blade on the grommet passageway. The wiper blade removes residual composition from the radial opening as the valve stem moves from an open position to a closed position and the sealing lip seals openings in the bottom portion of the valve stem when the valve stem is in the closed position.

An elongate valve stem is disposed in the grommet passageway. The elongate valve stem has an open top portion, a closed bottom portion with at least one radial opening, preferably two or more radial openings, disposed therein and a passageway between the open top portion and the at least one radial opening. A primary flange having a top side and a bottom side is disposed between the open top portion and the closed bottom portion. The bottom side of the primary flange is in compressible contacting relationship with the spring portion opening. The closed end of the valve stem is in sliding/contacting relationship with the internal diameter of the grommet passageway near the sealing portion opening. The sealing lip in the grommet passageway seals the radial openings in the valve stem when the valve stem is in a closed position.

The valve stem can be disposed in the grommet in a tilt valve or a vertical/unidirectional valve orientation. In the tilt orientation the top portion of the valve stem is tilted exposing the radial openings in the bottom portion of the valve stem to the aerosol product in the pressurized container. In the vertical orientation, the valve stem is arranged such that longitudinal translation of the valve stem results in substantially equivalent longitudinal compression of the grommet spring portion forcing the radial openings in the closed bottom portion of the valve stem past the sealing portion opening, exposing the radial openings to the aerosol product in the pressurized container.

The valve stem primary flange can have a primary flange diameter and the valve cup can include a cylindrical portion having an internal diameter near the open top portion which is substantially equivalent to the primary flange diameter such that the valve stem primary flange is in sliding contacting relationship with the valve cup internal diameter. The contacting relationship stabilizes the position of the valve stem. In addition, the valve cup may also include an internal edge near the open top portion of the valve cup. The internal edge has a diameter that is less than the valve stem primary flange diameter to limit the vertical travel of the valve stem in the valve cup opening by interfacing with the top side of the primary flange.

The valve stem may also include a secondary flange between the primary flange and the closed bottom portion. The secondary flange has a secondary flange diameter that is substantially equal to the grommet longitudinal passageway internal diameter. The secondary flange forms a secondary seal between the valve stem and the grommet longitudinal passageway.

A dispensing structure comprising a dip tube is disposed inside the open top end of the bottle and includes a dip tube housing having an open top end that is threaded or press fit into a cylindrical bottom portion of the valve cup. The sealing portion of the grommet provides a seal between the open top portion of the dip tube housing and the valve cup.

A dispensing structure comprising a collapsible bag disposed inside the open top end of the bottle may include a bag on valve design or a bag in bottle design. The bag on valve design includes a collapsible bag having an opening that is coaxial with the bottle opening and a flange that attaches to a cylindrical bottom portion of the valve cup with the grommet sealing portion providing a seal between the flange and the bottom portion of the valve cup. The bag in bottle design includes a collapsible bag having a neck forming an open neck end attached to and coaxial with the open top end of the bottle. The valve cup is threaded, welded, glued or press fit into the open neck end of the bag and the grommet sealing portion provides a seal between the neck of the bag and the valve cup.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

DETAILED DESCRIPTION OF THE INVENTION

The compressible valve according to the present invention will be described with reference to the following figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

Figure 1A:
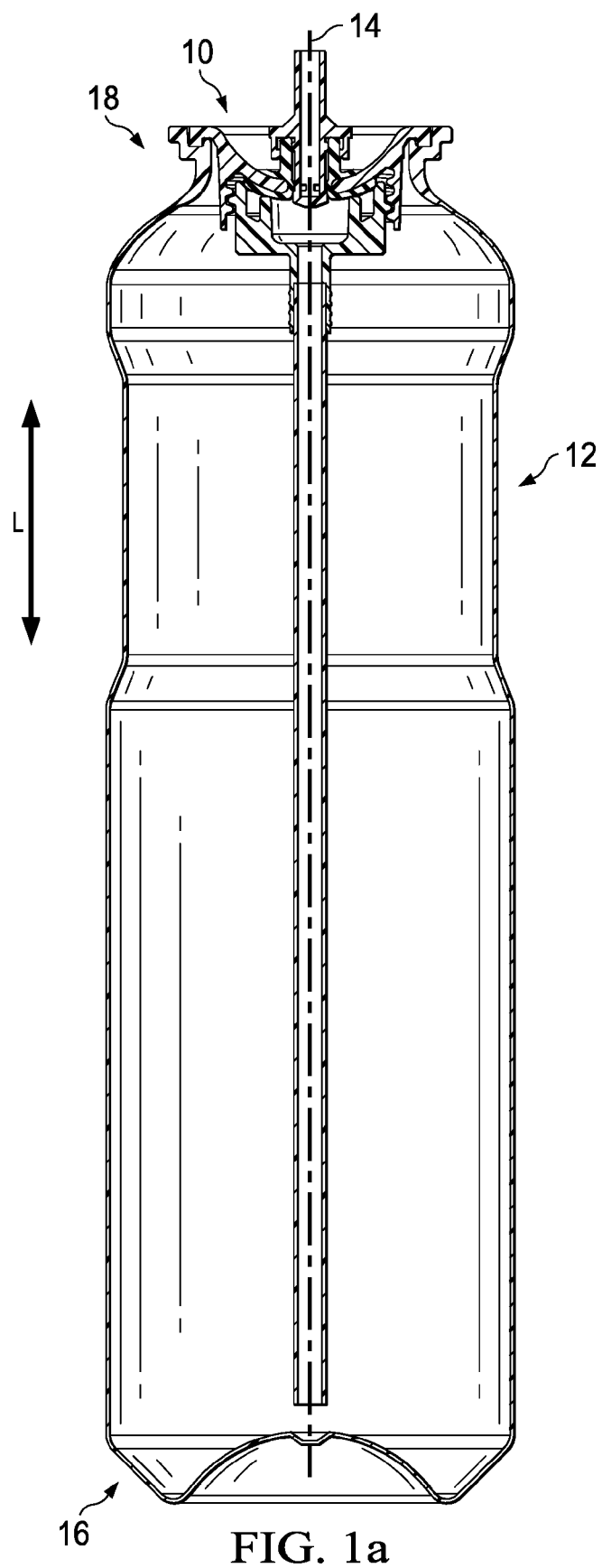
FIG. 1a is schematic view of a bottle including the compressible valve assembly of this invention with a dip tube valve assembled to the compressible valve.

FIG. 1a is a schematic illustration of the valve assembly 10 and the container 12. Although not shown, a combined actuator and nozzle can be mounted on the valve assembly 10.

As shown in FIG. 1a, the container comprises a bottle 12 having a longitudinal axis 14 defining a longitudinal direction L and a dispensing structure 15. The bottle 12 has a closed bottom end 16 and an open top end 18. The dispensing structure 15 can comprise dip tube valve 20 shown in FIG. 1b. The dip tube valve 20 comprising a valve housing 22 and tube 24 in a standard aerosol package where product and propellant are mixed in a bottle or can and the solution is expelled due to pressure from the propellant in vapor phase forcing liquid up the tube and through the valve housing 22 to a nozzle when the valve is open. Valve housing 22 may be designed to include a vapor tap for vapor mixing during dispensing For the embodiment shown in FIG. 1b, the valve housing 22 is attached to the bottom portion of the valve assembly 10. The valve assembly 10 is a three piece assembly composed of a valve cup 30, a valve stem 40 and a resilient annular sealing grommet 50. Both the valve stem 40 and grommet 50 have longitudinal axes aligned with the bottle longitudinal axis 14 and respective vertical passageways 58 and 46.

Figure 1B:
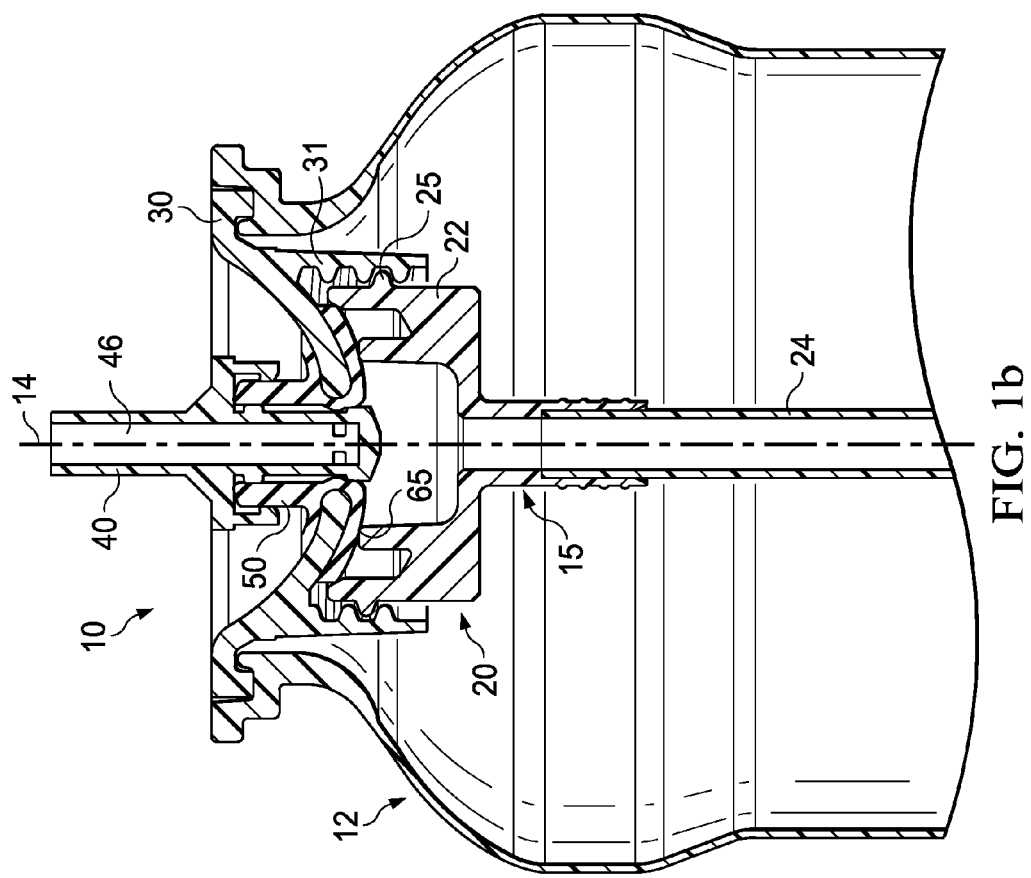
FIG. 1b is a schematic view of a compressible valve assembly of this invention with the dip tube housing attached to the valve.
Figure 2:
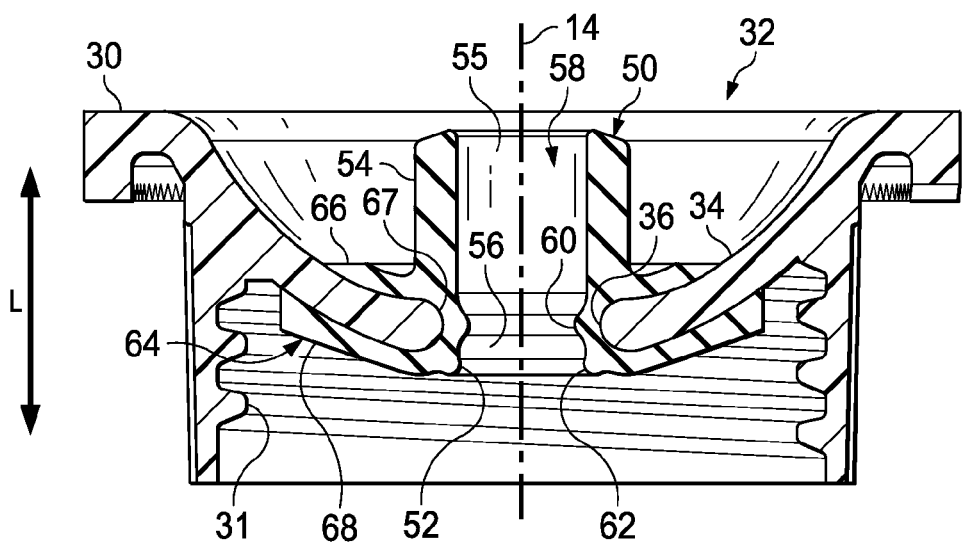
FIG. 2 is a schematic view of a valve cup and grommet of the compressible valve assembly shown in FIG. 1b.

For the embodiment shown in FIGS. 1a and 1b, the valve cup 30 is disposed inside the open top end 18 of the bottle 12. As shown in FIG. 2, the valve cup 30 has an open top portion 32 and a concave bottom portion 34 with an opening 36 in the center of the concave bottom portion 34. An open ended cylindrical portion 38 extends below the concave bottom portion 34 of the valve cup 30 for receiving the valve housing 22 of the dip tube valve 20. The open ended cylindrical portion 38 can include internal female threads 31 for mating with external male threads 25 on the valve housing 22 for a threaded connection. Alternatively, the cylindrical portion 38 can include an internal rim for mating with an external rim on the valve housing for a snap fit connection.

The grommet 50 is disposed in the opening 36 in the concave bottom portion 34 of the valve cup 30. The grommet 50 has a sealing portion 52 and a spring portion 54. The spring portion 54 extends toward the valve cup open top portion 32 and is deformable in the longitudinal direction L. The spring portion 54 includes a spring portion opening 55 having an internal diameter. The sealing portion 52 is disposed opposite the spring portion 54 at the opening 36 in the concave bottom portion 34 of the valve cup 30 and includes a sealing portion opening 56 having an internal diameter. A grommet longitudinal passageway 58 connects the spring portion opening 55 and the sealing portion opening 56 and has an internal diameter that is coaxial with the opening 36 in the concave bottom portion 34 of the valve cup 30. The grommet longitudinal passageway 58 includes a seal lip 60 and wiper blade 62 near the sealing portion opening 56. The wiper blade 62 removes residual product from the valve stem 40 and the seal lip 60 seals the valve stem 40 as the valve stem 40 is retracted into its sealing position. The valve stem 40 is fully described below.

The sealing portion 52 of the grommet 50 also includes a cylindrical clevis 64 having an upper disc 66 and a lower disc 68 forming a C-shaped crevice 67 extending circumferentially around and radially outward away from the sealing portion opening 56. The concave bottom portion 34 of the valve cup 30 is interposed between the upper disc 66 and the lower disc 68 of the clevis 64 such that the sealing portion opening 56 is coaxial with the opening 36 in the concave bottom portion 34.

As the valve housing 22 is connected to the valve cup 30 (either press fitted, welded, glued or threaded), the lower disc 68 of the clevis 64 is compressed between the valve housing 22 and the concave bottom portion 34 of the valve cup 30 providing a seal 65 between the valve housing 22 and the concave bottom portion 34 of the valve cup 30. The seal 65 eliminates the need for a separate gasket or seal at the connection between the valve cup 30 and valve housing 22. With the seal, the male threads 25 on the external surface of the valve housing 22 can be limited to a half thread as opposed to a full thread for threaded connections. The seal 65 also enables a simple snap fit connection between the valve cup 30 and valve housing 22 without requiring an additional gasket or seal between the valve housing 22 and the valve cup 30.

Figure 3:
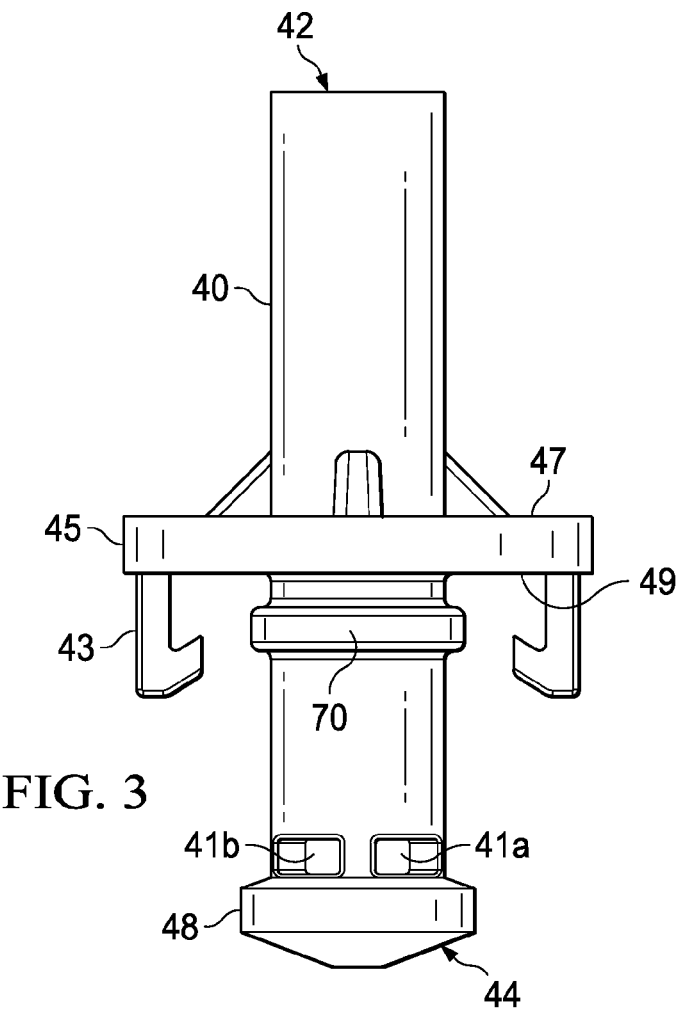
FIG. 3 is a schematic view of a valve stem of the compressible valve assembly in FIG. 1b.

The valve stem 40 shown in FIGS. 1b and 3 comprises an elongate valve stem having an open top portion 42 and a closed bottom portion 44 with a valve stem passageway 46 therebetween. The closed bottom portion 44 includes a protuberance forming a knob 48. At least one radial opening is disposed in the bottom portion just above the knob 48. Preferably, two or more radial openings 41a, 41b are disposed in the bottom portion 44 above the knob 48. The radial openings 41a and 41b are in fluid communication with the valve stem passageway 46. A primary flange 45 having a top side 47 and a bottom side 49 is disposed between the open top portion 42 and the knob 48. The bottom side 49 of the primary flange 45 interfaces with the spring portion 54 of the grommet 50 and includes L-shaped clasps 43 extending vertically from the bottom side 49 of the primary flange 45. The L-shaped clasps 43 grip the spring portion 54 of the grommet 50 and serve as a retention feature for the valve stem 40. A secondary flange 70 is disposed between the primary flange 45 and the knob 48. The secondary flange 70 interfaces with the grommet passageway 58 to prevent product from seeping up into the upper part of the grommet passageway 58 between the internal surface of the grommet passageway and the external surface of the valve stem 40.

The knob 48 on the lower portion of valve stem 40 fits into the sealing portion opening 56 in the grommet 50. When the valve 10 is in the closed position shown in FIG. 1a, the radial openings 41a, 41b in the valve stem 40 are sealed by the protruding lip 60 in the grommet sealing portion opening 56 and the top of the knob 48 abuts against the bottom surface of the protruding lip 60 thereby effectively sealing the product in the bottle from entering the valve openings 41a, 41b. When the valve stem 40 is pressed vertically during actuation, the knob 48 moves down below the opening 56 exposing the radial openings 41a, 41b to the product. As the pressure is removed, the stem 40 retracts into the opening 56. As the stem 40 retracts, the wiper blade 62 at the grommet sealing portion opening 56 removes residual product from the radial openings 41a and 41b and the seal lip 60 seals the openings.

The valve stem 40 is held closed by a return force exerted on the bottom side 49 of the primary flange 45 of the valve stem 40 by the spring portion 54 of the grommet 50. The spring portion 54 of the grommet 50 can exhibit a constant return force during the life of the unit.

Alternatively, the dispensing structure can comprise an aerosol barrier package disposed in a bottle including a bag on valve design, a bag on bottle design or a piston in bottle design. For the bag on valve and bag in bottle designs, product and propellant are separated via a bag. For the piston in bottle design, product and propellant are separated via a piston.

Figure 4:
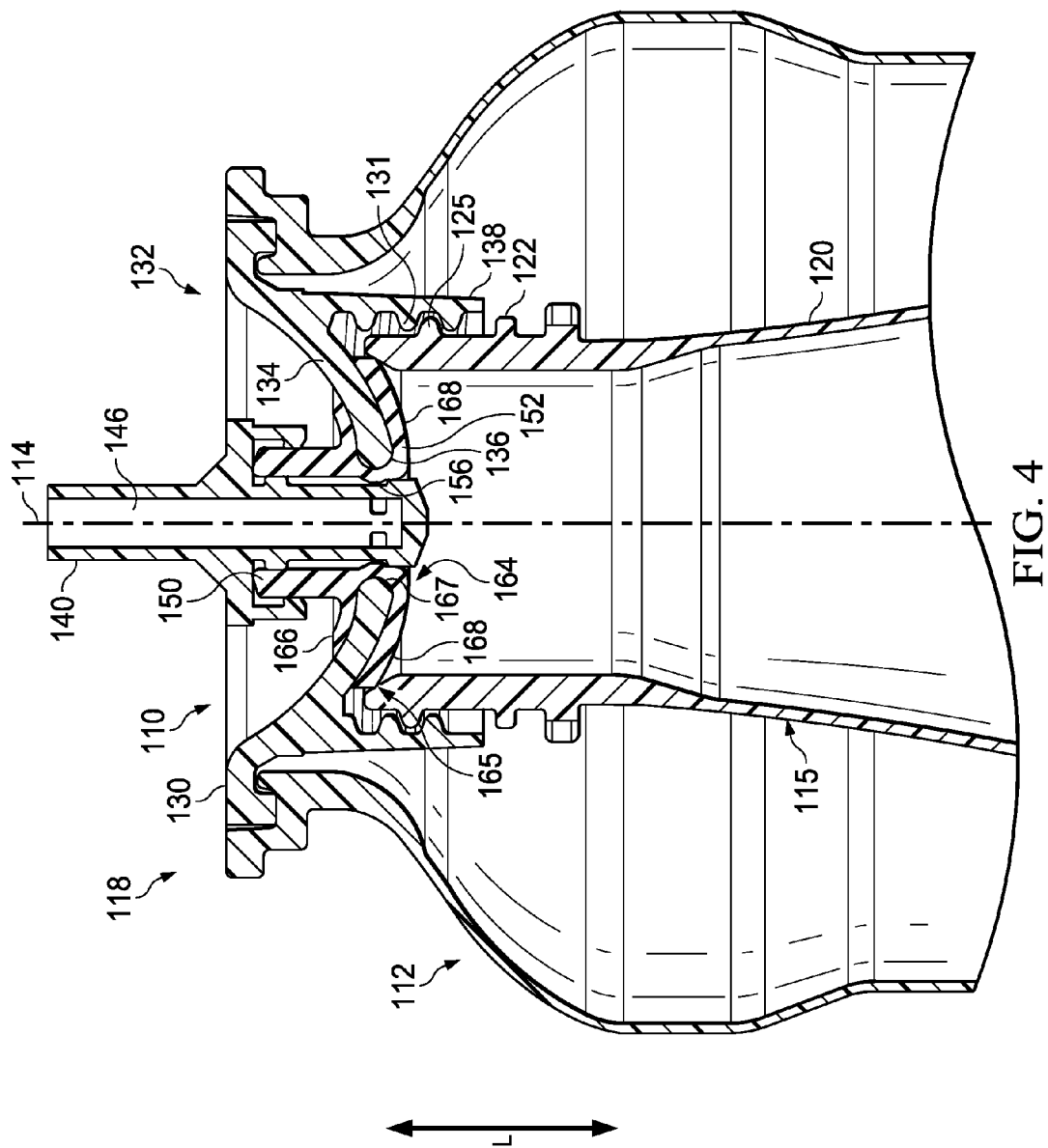
FIG. 4 is schematic view of a bottle opening including the compressible valve assembly of this invention with a collapsible bag assembled to the compressible valve.

The bag on valve dispensing structure 115, shown in FIG. 4, includes a bag 120 with a flange 122 at an open end attached to the bottom portion of the valve cup 130. For this embodiment, the valve cup 130 is disposed inside the open top end of the bottle 112. The valve cup 130 has an open top portion 132 and a concave bottom portion 134 with an opening 136 in the center of the concave bottom portion 134. The valve cup 130 includes cylindrical walls 138 that extend below the bottom portion 134 of the valve cup 130 similar to the valve housing to valve cup connection previously described and shown in FIG. 1. The cylindrical walls include internal (female) threads 131 that mate with external (male) threads 125 on the outer surface of the flange 122 at the bag open top portion. Alternatively, the cylindrical walls 138 can include an internal edge or rim that mates with and external rim or edge on the flange providing a snap fit arrangement.

For the bag on valve design shown in FIG. 4, the sealing portion 152 of the grommet 150 includes a cylindrical clevis 164 having an upper disc 166 and a lower disc 168 forming a C-shaped crevice 167 extending circumferentially around and radially outward away from the sealing portion opening 156. The concave bottom portion 134 of the valve cup 130 is interposed between the upper disc 166 and the lower disc 168 of the clevis 164 such that the sealing portion opening 156 is coaxial with the opening 136 in the concave bottom portion 134.

As the bag flange 122 is connected to the valve cup 130 (either press fitted or threaded), the lower disc 168 of the clevis 164 is compressed between the bag flange 122 and the concave bottom portion 134 of the valve cup 130 providing a seal 165 between the bag flange 122 and the concave bottom portion 134 of the valve cup 130. The seal 165 eliminates the need for a separate gasket or seal at the connection between the valve cup 130 and bag flange 122.

As shown in FIGS. 1a, 1b, and 4 the valve cup 30, 130 is inserted into the neck of the bottle opening and sealed against the neck to prevent the escape of propellant and loss of pressurization. Any suitable propellant may be used and may comprise a hydrocarbon as is known in the art, nitrogen, air, and mixtures thereof. If desirable the propellant may be condensable. By condensable, it is meant that the propellant transforms from a gaseous state of matter to a liquid state of matter uder the pressures encountered in use. A condensable propellant provides the benefit of a flatter depressurization curve as product is depleted during usage. The valve cup can be sealed to the neck of the bottle opening while the bottle is pressurized. A process for pressurizing the bottle and sealing the valve cup to the bottle opening is disclosed in commonly assigned US Patent Application Publications US2012/0292338A1, US2012/0291911A1; and US2012/0291912A1.

Figure 5:
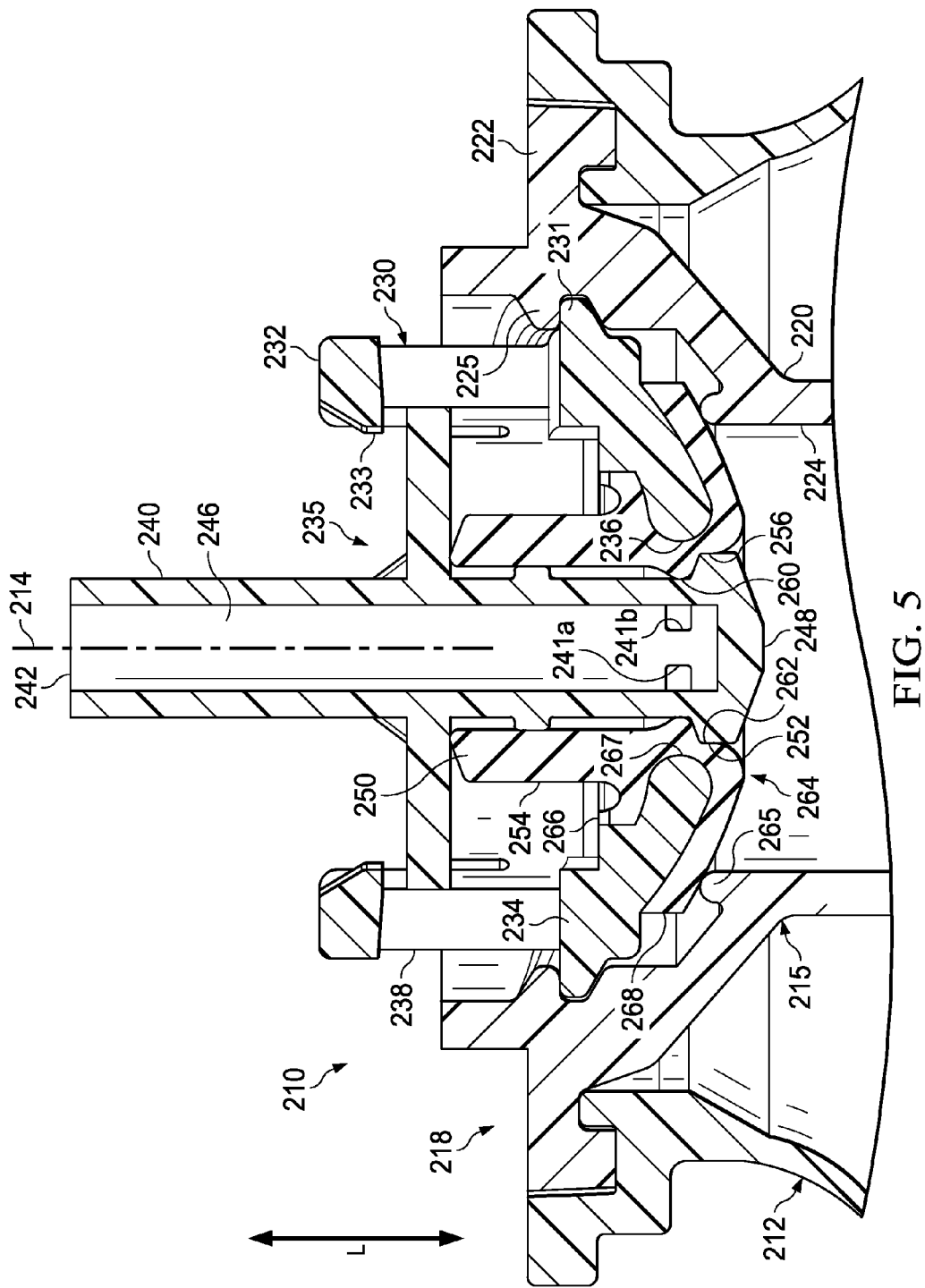
FIG. 5 is schematic view of a compressible valve assembly of this invention assembled in the opening of a collapsible bag which is assembled in a bottle opening.

For the bag in bottle design shown in FIG. 5, the bag 220 is inserted into a bottle 212 and the outer flange 222 of the bag is held/sealed to the flange at the open top portion of the bottle 212 via a bottle to bag weld as described in US Patent Application Publications US2012/0292338A1, US2012/0291911A1; and US2012/0291912A1 referenced above. The bag opening includes an open neck portion 224 which is interposed between the and coaxial with the bag outer flange and the bag opening. For this embodiment, the valve cup 230 of the valve cup assembly 210 is assembled in the opening in the top portion of the bag 220. Product is contained in the bag within the bottle, and is filled through the valve assembly. Propellant surrounds the bag 220 and is filled either through a port in the bottom of the bottle or through gaps between the bottle opening flange and the bag outer flange prior to welding. Product is expelled due to pressure being applied to the bag and forcing solution out through the valve, which is similar to squeezing a tube to dispense product.

Figure 6:
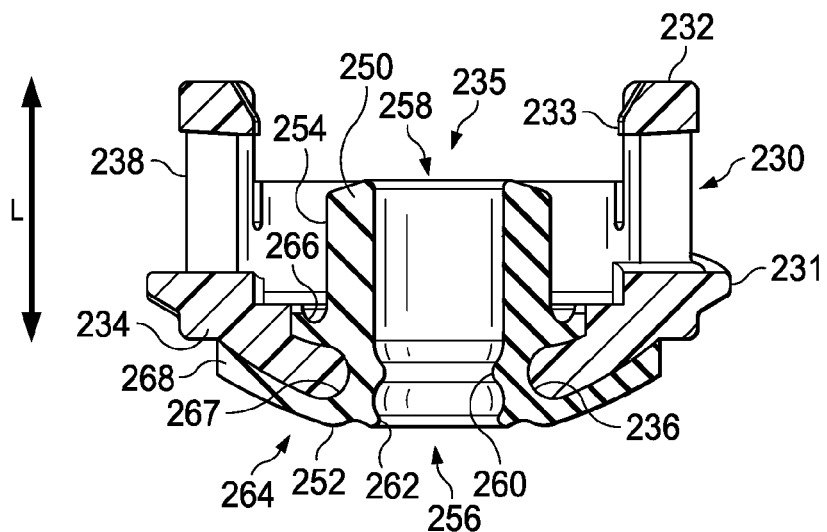
FIG. 6 is a schematic view of a valve cup and grommet of the compressible valve assembly shown in FIG. 5.

For the embodiment shown in FIGS. 5 and 6, the valve cup 230 has an open top portion 232 and a concave bottom portion 234 with an opening 236 in the center of the concave bottom portion 234. An open ended cylindrical portion 238 extends between the open top portion 232 and the concave bottom portion 234. The open ended cylindrical portion 238 includes a longitudinal passageway 235 having an internal diameter that extends in the longitudinal direction L between the open top portion 232 and the concave bottom portion 234. An internal rim or edge is disposed in the longitudinal passageway near the open top portion of the valve cup. The internal rim 233 has an internal diameter that is less than the internal diameter of the cylindrical portion 238 longitudinal passageway 235. The valve cup 230 can include external (male) threads 231 on the outer surface that thread into internal (female) threads 225 in the open top portion of the bag 220. Alternatively, the valve cup 234 can include a rim on the outer surface that mates with a rim on the open top portion of the bag providing a snap fit.

For the bag in bottle design shown in FIG. 5, the sealing portion 252 of the grommet 250 also includes a cylindrical clevis 264 having an upper disc 266 and a lower disc 268 forming a C-shaped crevice 267 extending circumferentially around and radially outward away from the sealing portion opening 236. The concave bottom portion 234 of the valve cup 230 is interposed between the upper disc 266 and the lower disc 268 of the clevis 264 such that the sealing portion opening 256 is coaxial with the opening in the concave bottom portion.

As the valve cup 230 is connected to the bag opening (either press fit or threaded), the lower disc 268 of the clevis 264 is compressed between the neck of bag opening 224 and the concave bottom portion 234 of the valve cup 230 providing a seal 265 between the bag opening 224 and the concave bottom portion 234 of the valve cup 230. The seal 265 eliminates the need for a separate gasket or seal at the connection between the valve cup and bag opening.

Figure 7:
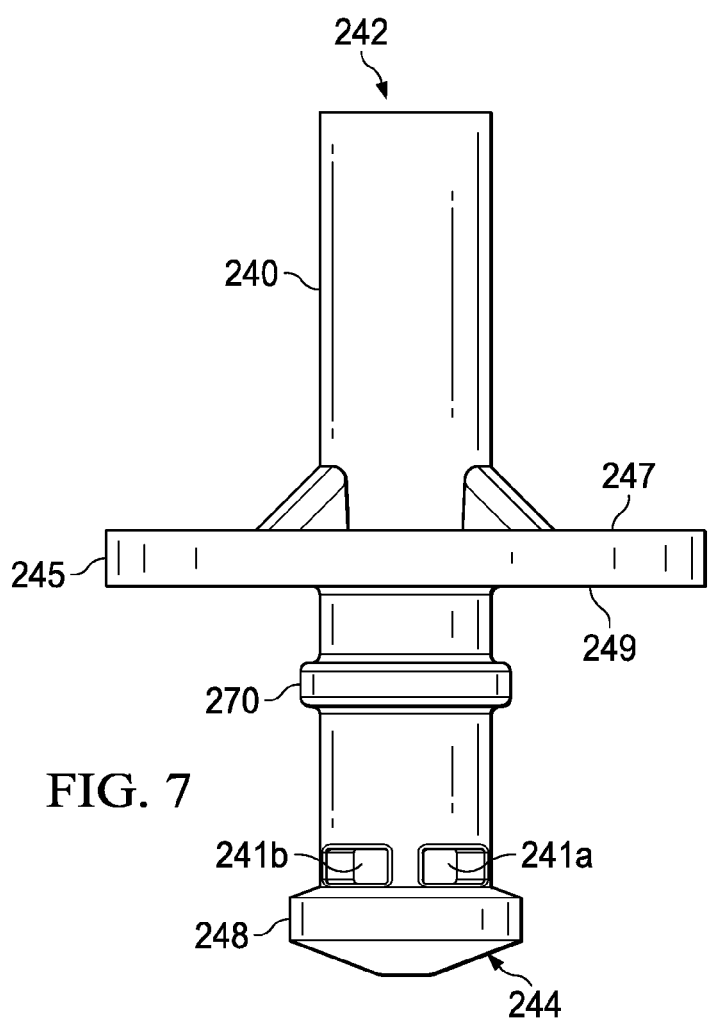
FIG. 7 is a schematic view of a valve stem of the compressible valve assembly shown in FIG. 5.

Similar to the other embodiments previously described, the valve stem 240 for the bag in bottle design shown in FIGS. 5 and 7 comprises an elongate valve stem having an open top portion 242 and a closed bottom portion 244 with a valve stem passageway 246 therebetween. The closed bottom portion 244 includes a protuberance forming a knob 248. At least one radial opening is disposed in the bottom portion just above the knob. Preferably, two or more radial openings 241a and 241b are disposed in the bottom portion 244 above the knob 248. The radial openings 241a and 214b are in fluid communication with the valve stem passageway 246.

A primary flange 245 having a top side 247 and a bottom side 249 is disposed between the open top portion 242 and the knob 248 at the closed bottom portion 244 of the valve stem 240. The bottom portion 249 of the primary flange 245 interfaces with the spring portion 254 of the grommet 250. Similar to the stems previously described, the primary flange 245 of the valve stem can include L-shaped clasps extending vertically from the bottom side of the flange that interface with the spring portion of the grommet for retention of the valve stem in the valve cup. Alternatively, for this embodiment, the outer diameter of the primary flange 245 can be sized to provide a slip fit between the primary flange 245 and the longitudinal passageway 235 of the open top portion 232 of the cylindrical portion 238 to help dimensionally stabilize valve stem 240 and minimize any tendency to tilt during actuation. The diameter of the primary flange 245 is also larger than the internal diameter of the internal rim 233 or edge disposed in the longitudinal passageway near the open top portion 232 of the valve cup 230 to retain the valve stem 240 in the valve cup 230. A secondary flange 270 is disposed between the primary flange 245 and the knob 248. The secondary flange 270 interfaces with the grommet passageway 258 to prevent product from seeping up into the upper part of the grommet passageway 258 between the internal surface of the grommet passageway and the external surface of the valve stem 240.

As shown in FIG. 5, the knob 248 on the lower closed portion 244 of valve stem 240 fits into the sealing portion opening 256 in the grommet 250. When the valve assembly 210 is in the closed position, the radial openings 241a and 241b in the valve stem 240 are sealed by the protruding lip 260 in the grommet sealing portion opening 256 and the top of the knob 248 abuts against the bottom surface of the protruding lip 260 thereby effectively sealing the product in the bottle 212 from entering the valve openings 241a and 241b. When the valve stem 240 is pressed vertically during actuation, the knob 248 moves down below the opening 256 exposing the radial openings 241a and 241b to the product. As the pressure is removed, valve stem 240 retracts into the opening 256. As the stem retracts, the wiper blade 262 at the grommet sealing portion opening 256 removes residual product from the radial openings 241a and 241b and the seal lip 260 seals the openings.

For the piston bottle design, product and propellant are separated via a piston inserted in the bottle. Product sits above the piston and is filled either under the cup or through the valve. Propellant is added below the piston via a second valve in the bottle bottom. Product is dispensed as the piston is pushed up by the propellant forcing the product out of the valve. Although not shown, the valve assembly for the piston bottle design can include the dip tube valve assembly shown in FIGS. 1a and 1b.

The valve cup is preferably molded from Polyethylene Terephthalate (PET) and the grommet is molded from Thermoplastic Elastomer (TPE). PET is a standard resin currently used carbonated soft drink containers. The TPE formulation includes:
1) Base Elastomer—polyester based elastomer (from the Hytrel family of resins).
2) Tackifier—usually a small polymer or oligomer that provides the adhesion of the TPE to the PET (substrate)
3) Processing Aid—provides for process-ability of the material and subtle changes to the durometer of the material The TPE formulation is optimized for product/package compatibility, adhesion to the PET and compatibility with the current PET recycling stream. In addition the TPE can withstand swelling shrinking or changes in mechanical properties associated with a container under pressure. The preferred TPE is HCC8791-52 provided by Krailburg.

In order to provide ultimate adhesion between the valve cup and the sealing portion of the grommet, the valve cup and the grommet are preferably injection molded. The injection molding system could use a range of molding techniques to achieve the bonding necessary between the TPE and PET including but not limited to over molding, transfer molding, cube molding, core-back molding, spin-stack molding, helicopter molding, rotating platen molding.

Regarding all numerical ranges disclosed herein, it should be understood that every maximum numerical limitation given throughout this specification includes every lower numerical limitation, as if such lower numerical limitations were expressly written herein. In addition, every minimum numerical limitation given throughout this specification will include every higher numerical limitation, as if such higher numerical limitations were expressly written herein. Further, every numerical range given throughout this specification will include every narrower numerical range that falls within such broader numerical range and will also encompass each individual number within the numerical range, as if such narrower numerical ranges and individual numbers were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A compressible valve for use with a pressurized container for dispensing an aerosol product, the pressurized container having a longitudinal axis defining a longitudinal direction and comprising a bottle having an open top end and a dispensing structure disposed inside the open top end of the bottle, the dispensing structure having an open end coaxial with the bottle open top end, the compressible valve comprising:
   a. a valve cup disposed inside the open top end of the bottle, the valve cup having an open top portion, a bottom portion with an opening therein and a longitudinal passageway between the open top portion and the bottom portion opening, wherein the valve cup comprises a cylindrical portion near the open top portion, the cylindrical portion having an internal diameter;
   b. a grommet disposed in the opening in the bottom portion of the valve cup, the grommet having a sealing portion and spring portion, wherein the sealing portion is integral with the spring portion, a spring portion opening, a sealing portion opening, and a grommet longitudinal passageway therebetween, the grommet longitudinal passageway has an internal diameter and is coaxial with the valve cup longitudinal passageway, the sealing portion is joined to the valve cup bottom portion and provides a seal between the dispensing structure and the valve cup, the spring portion is longitudinally opposed to the sealing portion towards the valve cup open top portion, the spring portion is deformable in the longitudinal direction; and
   c. a valve stem disposed in the grommet passageway, the valve stem comprising an open top portion, a closed bottom portion with at least one radial opening disposed therein, a passageway between the open top portion and the at least one radial opening, and a primary flange having a top side and a bottom side disposed between the open top portion and the closed bottom portion, wherein the valve stem primary flange has a primary flange diameter that is sized close to the valve cup cylindrical portion internal diameter such that the primary flange is in sliding contacting relationship with the cylindrical portion and wherein the bottom side of the primary flange is in compressible contacting relationship with the grommet spring portion and the closed end is in radial contact with the grommet longitudinal passageway near the grommet sealing portion opening providing a seal between the at least one radial opening in the valve stem and the grommet longitudinal passageway when the valve stem is in a closed position, wherein longitudinal translation of the valve stem primary flange results in equivalent longitudinal deflection of the spring portion exposing the at least one radial opening to the aerosol product when the valve stem is in an open position.

2. A compressible valve according to claim 1 wherein the bottle comprises PET.

3. A compressible valve according to claim 1 wherein the valve stem primary flange comprises clasps on the bottom side of the primary flange that grip the spring portion of the grommet retaining the valve stem in the grommet longitudinal passageway.

4. A compressible valve according to claim 1 wherein the sealing portion of the grommet comprises a clevis, the clevis having a C-shaped opening disposed radially outward from the sealing portion opening, wherein the valve cup bottom portion opening is sandwiched in the C-shaped opening of the clevis.

5. A compressible valve according to claim 1, wherein the valve cup comprises plastic.

6. A compressible valve according to claim 1 wherein the grommet comprises an elastomer.

7. A compressible valve according to claim 5 wherein the valve cup comprises PET or PEN.

8. A compressible valve according to claim 6 wherein the grommet comprises TPE.

9. A compressible valve according to claim 1 wherein grommet is integrally formed with the valve cup.

10. A compressible valve according to claim 9 wherein the grommet and valve cup are dual injection molded.

11. A compressible valve according to claim 1 wherein the grommet sealing portion opening includes a wiper blade which removes residual composition from the at least one radial hole opening as the valve stem translates from the open position to the closed position.

12. A compressible valve according to claim 1 wherein the valve stem further comprises a secondary flange between the primary flange and the closed bottom portion, wherein the secondary flange makes radial contact with the internal diameter of the grommet longitudinal passageway.

13. A compressible valve according to claim 1 wherein the valve cup includes an internal lip at the open top portion of the valve cup, the internal lip having a diameter that is less than the primary flange diameter to limit the vertical travel and retain the valve stem in the valve cup longitudinal passageway.

14. A compressible valve according to claim 1 wherein the dispensing structure comprises a collapsible bag disposed inside the open top end of the bottle, the collapsible bag having a neck with an open neck end coaxial with the bottle open top end.

15. A compressible valve according to claim 14 wherein the sealing portion of the grommet provides a seal between the neck of the bag and the valve cup.

16. A compressible valve according to claim 14 wherein the valve cup is threaded to the open neck end of the collapsible bag.

17. A compressible valve according to claim 14 wherein the valve cup is snap fit into to the open neck end of the collapsible bag.

18. The compressible valve according to claim 1 wherein the dispensing structure comprises a dip tube valve disposed inside the open top end of the bottle, the dip tube valve comprising a dip tube valve housing having an open top end coaxial with the opening in the bottom portion of the grommet.

19. A compressible valve according to claim 18 wherein the sealing portion of the grommet provides a seal between the open top portion of the dip tube housing and the valve cup.

\* \* \* \* \*